United States Patent
Weber et al.

(10) Patent No.: US 10,454,355 B2
(45) Date of Patent: Oct. 22, 2019

(54) LONG STATOR LINEAR MOTOR AND METHOD FOR MOVING A TRANSPORT UNIT OF A LONG STATOR LINEAR MOTOR

(71) Applicant: B&R INDUSTRIAL AUTOMATION GMBH, Eggelsberg (AT)

(72) Inventors: Andreas Weber, Salzburg (AT); Manuel Plainer, Weissenkirchen i.A. (AT); Stefan Brucker, Salzburg (AT)

(73) Assignee: B&R INDUSTRIAL AUTOMATION GMBH, Eggelsberg (AT)

( * ) Notice: Subject to any disclaimer, the term of this patent is extended or adjusted under 35 U.S.C. 154(b) by 0 days.

(21) Appl. No.: 16/022,072

(22) Filed: Jun. 28, 2018

(65) Prior Publication Data
US 2019/0006930 A1    Jan. 3, 2019

(30) Foreign Application Priority Data

Jun. 29, 2017 (AT) .................................. 50533/2017

(51) Int. Cl.
*H02K 41/03* (2006.01)
*B60L 13/03* (2006.01)
(Continued)

(52) U.S. Cl.
CPC ............ *H02K 41/031* (2013.01); *B60L 13/03* (2013.01); *B60L 15/40* (2013.01); *B65G 43/10* (2013.01); *B65G 54/02* (2013.01); *H02K 41/033* (2013.01); *H02P 6/006* (2013.01); *H02P 25/06* (2013.01)

(58) Field of Classification Search
CPC ... H02K 41/00; H02P 1/00; H02P 3/00; H02P 5/00; H02P 7/00; H02P 6/006; H02P 6/00;
(Continued)

(56) References Cited

U.S. PATENT DOCUMENTS

| 4,675,582 A | 6/1987 | Hommes et al. |
|---|---|---|
| 6,876,107 B2 | 4/2005 | Jacobs |

(Continued)

FOREIGN PATENT DOCUMENTS

| DE | 10 2008 008 602 | 12/2008 |
|---|---|---|
| DE | 10 2012 025 326 | 6/2014 |

(Continued)

OTHER PUBLICATIONS

Austria Search Report conducted in counterpart Austria Appln. No. A 50533/2017 (dated Apr. 19, 2018).

*Primary Examiner* — Antony M Paul
(74) *Attorney, Agent, or Firm* — Greenblum & Bernstein, P.L.C.

(57) ABSTRACT

In a transition of a transport unit of a long stator linear motor from a first control zone to a following second control zone in a movement direction, a first segment control unit is responsible for controlling the movement of the transport unit and the first control zone is extended, in the movement direction, by a number of virtual drive coils. The first segment control unit, which is assigned to the first control zone, calculates manipulated variables for the virtual drive coils, and transmits the manipulated variables for the virtual drive coils to the second segment control unit, which is assigned to the second control zone. The second segment control unit uses the transmitted manipulated variables for the virtual drive coils in order to energize the drive coils of the second control zone for moving the transport unit.

10 Claims, 3 Drawing Sheets

(51) Int. Cl.
   B60L 15/40   (2006.01)
   B65G 43/10   (2006.01)
   B65G 54/02   (2006.01)
   H02P 6/00    (2016.01)
   H02P 25/06   (2016.01)

(58) Field of Classification Search
   CPC ........... H02P 7/29; H02P 41/02; B65G 43/02;
                  B65G 35/06; B65G 54/02; B65G 43/06;
                  B60L 15/005; B60L 13/10; G05B
                  19/0421; G05B 11/00; G05B 11/28
   USPC .... 318/135, 687, 38, 400.01, 700, 701, 727,
                  318/799, 800, 801, 430; 363/21.1, 40,
                  363/44, 95, 120, 175; 361/20, 30
   See application file for complete search history.

(56) References Cited

U.S. PATENT DOCUMENTS

| | | | |
|---|---|---|---|
| RE39,747 E | * | 7/2007 | Peltier .................... 310/12.11 |
| 8,649,901 B2 | | 2/2014 | Nemeth-Csoka et al. |
| 9,621,097 B2 | * | 4/2017 | Takagi ................ H02P 29/032 |
| 2013/0074724 A1 | | 3/2013 | King et al. |
| 2014/0097783 A1 | | 4/2014 | Hara |
| 2015/0137625 A1 | | 2/2015 | Achterberg et al. |
| 2015/0303841 A1 | | 10/2015 | Suzuki et al. |

FOREIGN PATENT DOCUMENTS

| | | |
|---|---|---|
| EP | 1 270 311 | 1/2003 |
| WO | 98/50760 | 11/1998 |
| WO | 2013/143783 | 10/2013 |

\* cited by examiner

LONG STATOR LINEAR MOTOR AND METHOD FOR MOVING A TRANSPORT UNIT OF A LONG STATOR LINEAR MOTOR

CROSS-REFERENCE TO RELATED APPLICATIONS

The present application claims priority under 35 U.S.C. 119(a) of Austria Patent Application No. A50533/2017 filed Jun. 29, 2017, the disclosure of which is expressly incorporated by reference herein in its entirety.

BACKGROUND OF THE INVENTION

1. Field of the Invention

The present invention relates to a long stator linear motor comprising a plurality of drive coils that form a long stator of the long stator linear motor, along which a transport unit comprising an arrangement of drive magnets can be moved in the movement direction, the long stator being divided into at least one first control zone comprising a plurality of drive coils and a second control zone comprising a plurality of drive coils, the first control zone being assigned a first segment control unit for controlling the drive coils of the first control zone, and the second control zone being assigned a second segment control unit for controlling the drive coils of the second control zone, in that, in a control zone, the assigned segment control unit calculates the manipulated variables for energizing the drive coils in the control zone that are required for moving the transport unit, as long as the transport unit is located exclusively in one control zone. The invention further relates to a method for moving a transport unit of a long stator linear motor of this kind.

2. Discussion of Background Information

Long stator linear motors and the applications thereof, in particular for flexible transport purposes, as well as the mode of operation thereof, have been known for many years. Long stator linear motors generally consist of a number of drive coils that are stationary arranged side by side and form the long stator of the long stator linear motor. The long stator forms a conveying path, along which the individual transport units can be moved. In this case, the transport units are retained and guided on the conveying path. Drive magnets (permanent magnets or electromagnets) are arranged on the transport unit for this purpose, which magnets interact with the magnetic field generated by the drive coils. Selective actuation of the drive coils, in particular by applying a corresponding coil voltage for generating a drive current, makes it possible to generate a magnetic field that moves along the conveying path in the movement direction, as a result of which a transport unit that interacts with the moving magnetic field can be moved in the movement direction (direction of the moving magnetic field). In this way, a plurality of transport units can be moved along the conveying path independently of one another. The structure, the function and the control of long stator linear motors of this kind are well known, and this will therefore not be discussed in greater detail here. Examples of this can be found in WO 2013/143783 A1, WO 98/50760 A2, U.S. Pat. No. 6,876,107 B2, US 2013/0074724 A1 or der EP 1 270 311 B1. In general, a long stator linear motor is constructed having a plurality of coil segments that are arranged side by side and comprise a number of drive coils, as in U.S. Pat. No. 6,876,107 B2 for example.

U.S. Pat. No. 5,876,107 B2 and EP 1 270 311 B1 for example each also describe the control structure in greater detail. In this case, a modular control structure is generally used, in which a plurality of segment controllers are provided that each control a specified number of drive coils, preferably the drive coils of a coil segment (if present). The segment controllers in each case determine the drive currents of the drive coils required for moving a transport unit of the long stator linear motor. Said drive coil currents are generated by applying corresponding voltages to the drive coils. In order to control the movement of a transport unit, it is also necessary to determine the relevant actual position of the transport unit to be controlled, preferably by means of suitable position sensors.

However, due to the modular control structure, it is necessary to transfer the control of one transport unit, in a systematic manner, from one segment controller to the following segment controller when the transport unit crosses the segment boundary. Since a plurality of drive coils usually interact simultaneously with the drive magnets of a transport unit, a plurality of drive coils also have to be energized in order to move said transport unit. It is therefore possible that drive coils of different segment controllers need to be energized in the region of a segment boundary. Said different segment controllers therefore need to cooperate in a suitable manner in order to ensure seamless movement of a transport unit across a segment boundary.

For this purpose, EP 1 270 311 B1 proposes connecting the individual segment controllers by means of a powerful communications interface in order to exchange data relevant to the movement. A first segment controller detects the position of a transport unit in the assigned first control zone (corresponds to a number of drive coils, e.g. a coil segment) and determines, on the basis of the detected actual position and a specified setpoint position and using a suitable controller, the propulsive force that is to be set on the transport unit and that is required for correcting errors between the actual position and the setpoint position. The drive currents of the drive coils to be energized, which currents are required for setting the propulsive force, are then determined in the segment controller, from the determined propulsive force. If the transport unit enters the region of the boundary with the following second control zone, the first segment controller determines the actual position and the propulsive force as before, from which propulsive force the drive currents in the first control zone can again be calculated. At the same time, the first segment controller transmits the detected actual position and the propulsive force to be set to the second segment controller of the following second control zone via the communications interface. In the same way as the first segment controller, the second segment controller calculates, using a suitable controller, the drive currents for the drive coils assigned to the second segment controller. At some point, the position detection of the transport unit switches to the second segment controller which then calculates the propulsive force to be set, which propulsive force the second segment controller subsequently communicates, together with the detected actual position, to the first segment controller that calculates the coil currents of the drive coils of its first control zone. If the transport unit is now moved only by drive coils of the second control zone, then only the second segment controller is now active.

DE 10 2008 008 602 A1 also describes a similar method for carrying out a systematic transition of a transport unit of a long stator linear motor across a segment boundary.

SUMMARY OF THE EMBODIMENTS

From these known methods for carrying out a systematic transition of a transport unit of a long stator linear motor across control zones as starting point, embodiments of the present invention provide a simpler method and a long stator linear motor for this purpose.

In embodiments, during the transition of the transport unit from the first control zone, in the movement direction, to the following second control zone, wherein drive coils of the first control zone and of the second control zone being energized in order to move the transport unit, initially the first segment control unit remains responsible for controlling the movement of the transport unit and the first control zone is extended, in the movement direction, by a number of virtual drive coils, and the first segment control unit that is assigned to the first control zone also calculates the manipulated variables for the required virtual drive coils, the first segment control unit transmits the necessary manipulated variables for the required virtual drive coils to the second segment control unit that is assigned to the second control zone, and the second segment control unit uses the transmitted manipulated variables for the required virtual drive coils in order to energize the drive coils of the second control zone that are required for moving the transport unit. In this way, the manipulated variables for the drive coils required for moving the transport unit are always calculated by just one segment control unit, reducing the computational effort in the segment control units. Moreover, the data communication line does not need to transfer measured position values or a propulsive force, as was hitherto conventional in the prior art, but instead the manipulated variables for the drive coils can be transmitted directly.

A particularly simple method results when the second segment control unit assigns the virtual drive coils of the first control zone to drive coils of the second control zone, and uses the received manipulated variables of the virtual drive coils for energizing the assigned drive coils of the second control zone. The manipulated variables of the virtual drive coils can thus be used directly as manipulated variables of the drive coils actually present in the second control zone.

It is furthermore advantageous if, after a defined time point of the transition, the responsibility for controlling the movement of the transport unit switches to the second segment control unit of the second control zone, and the second control zone is extended, counter to the movement direction, by a number of virtual drive coils, and the second segment control unit that is assigned to the second control zone also calculates the manipulated variables for the required virtual drive coils, the second segment control unit transmits the necessary manipulated variables for the required virtual drive coils to the first segment control unit that is assigned to the first control zone, and the first segment control unit uses the transmitted manipulated variables for the required virtual drive coils in order to energize the drive coils of the first control zone that are required for moving the transport unit. Here, too, the virtual drive coils may advantageously be directly assigned to drive coils that are actually provided.

A well-balanced distribution of the control of the movement of a transport unit can be achieved if the responsibility switches from the first segment control unit to the second segment control unit when the center of the arrangement or the drive magnets of the transport unit transitions from the first control zone to the second control zone. As a result, the required computing power is substantially divided between the two segment control units.

BRIEF DESCRIPTION OF THE DRAWINGS

The present invention will be described in greater detail in the following with reference to FIGS. 1 to 3D, which schematically show non-limiting, advantageous embodiments of the invention by way of example. In the drawings.

DETAILED DESCRIPTION OF THE EMBODIMENTS

The particulars shown herein are by way of example and for purposes of illustrative discussion of the embodiments of the present invention only and are presented in the cause of providing what is believed to be the most useful and readily understood description of the principles and conceptual aspects of the present invention. In this regard, no attempt is made to show structural details of the present invention in more detail than is necessary for the fundamental understanding of the present invention, the description taken with the drawings making apparent to those skilled in the art how the several forms of the present invention may be embodied in practice.

Figure 1:
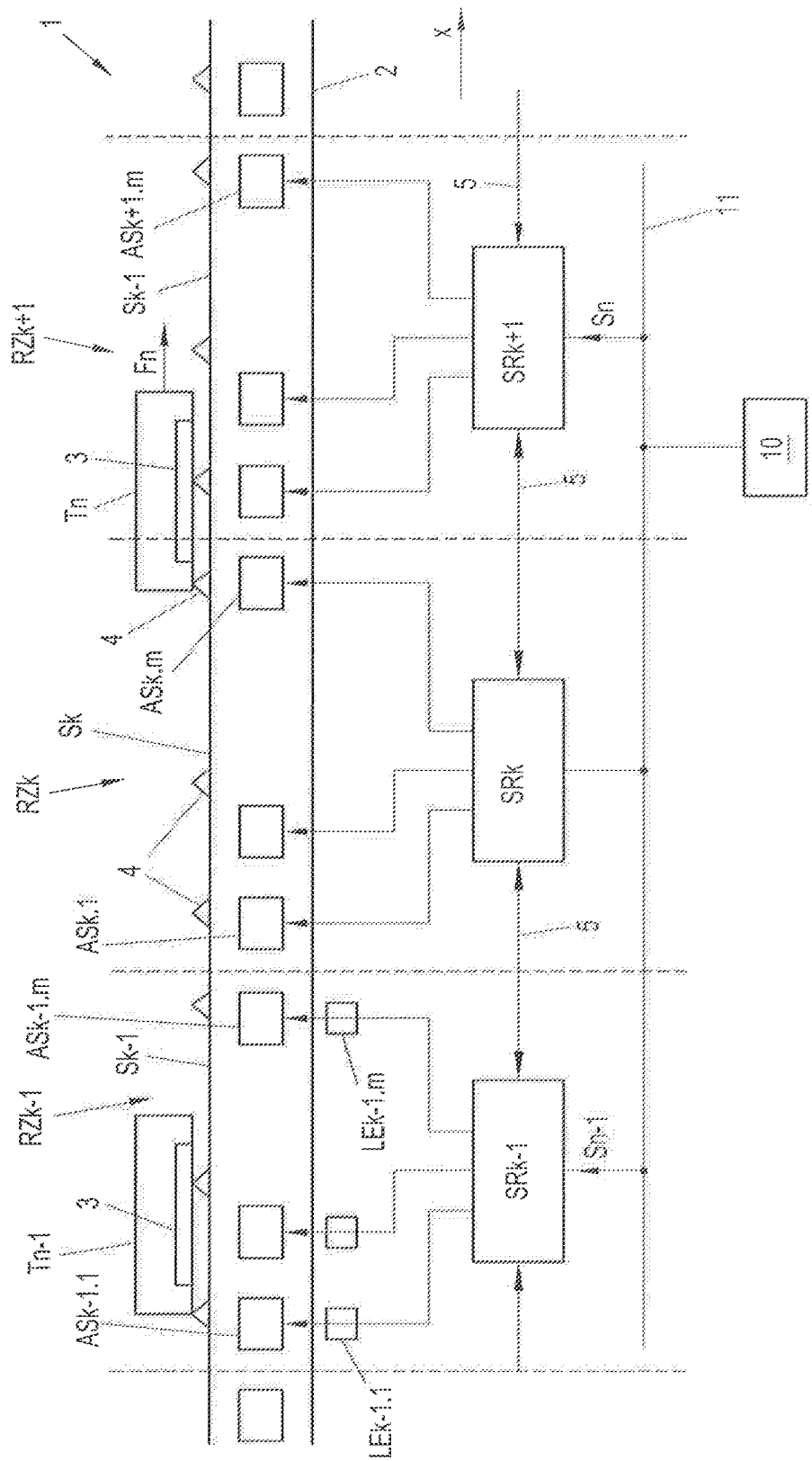
FIG. 1 shows a long stator linear motor comprising control zones and drive coils that are controlled by assigned segment control units.

FIG. 1 describes the per se known basic structure of a long stator linear motor 1. A plurality of drive coils $ASk-1.1, \ldots, ASk+1.m$ are stationary arranged side by side, in order to form the long stator 2 of the long stator linear motor 2. To that end, the long stator need not necessarily be arranged in a straight line, as in FIG. 1, but instead can of course also be curved as desired, at least in portions. In general, but not necessarily, a number of coil segments $Sk-1, Sk, Sk+1$ are provided, on each of which a number m of drive coils $ASk-1.1, \ldots, ASk-1.m, ASk.1, \ldots, ASk.m, ASk+1.1, \ldots, ASk+1.m$ is arranged. It should be noted, however, that not every coil segment $Sk-1, Sk, Sk+1$ need comprise the same number m of drive coils. A coil segment $Sk-1, Sk, Sk+1$ is thus a modular part of the long stator linear motor 1, and the long stator 2 can be assembled by arranging coil segments $Sk-1, Sk, Sk+1$ of this kind side by side. A coil segment $Sk-1, Sk, Sk+1$ can be shaped as desired, for example as a straight line, a curve, an S-bend, an arc, switch, etc., resulting in a wide range of design options for a long stator 2.

A plurality of transport units Tn (where $n \geq 1$) can be moved along the long stator 2 at the same time. For this purpose, at least one drive magnet 3, either in the form of a permanent magnet or an electromagnet, is arranged on the transport unit Tn in each case, and the magnetic field of which magnet interacts with the electromagnetic field generated by the drive coils in the region of the transport unit Tn, in order to generate a propulsive force Fn on the transport unit. Generating an electromagnetic field that moves in the movement direction x makes it possible for the transport unit Tn to be moved along the long stator 2. As a result, in a known manner, a plurality of transport units Tn can be moved simultaneously in any desired manner (position, direction, speed, acceleration), in that the drive coils ASk−1.1, . . . , ASk+1 in that interact with the transport unit Tn in each case being energized as required for the desired movement.

For this purpose, segment control units SRk−1, SRk, SRk+1 in the form of suitable computer or microcontroller hardware and/or computer or microcontroller software are provided. A segment control unit SRk−1, SRk, SRk+1 is responsible for one control zone RZk−1, RZk, RZk+1 comprising a number of drive coils ASk−1.1, . . . , ASk+1.m in each case. If coil segments Sk−1, Sk, Sk+1 are provided, one segment control unit Sk−1, Sk, Sk+1 is preferably responsible for the drive coils ASk−1.1, . . . , ASk−1.m, ASk.1, . . . , ASk.m, ASk+1.1, . . . , ASk+1., of one coil segment Sk−1, Sk, Sk+1 in each case, as indicated in FIG. 1. In this case, one control zone RZk−1, RZk, RZk+1 corresponds to one coil segment Sk−1, Sk, Sk+1, but this is not always necessary. However, for the sake of simplicity this will be assumed in the following description.

The segment control units Sk−1, Sk, Sk+1 are responsible for determining, for the drive coils ASk−1.1, . . . , ASk−1.m, ASk.1, . . . , ASk.m, ASk+1.1, . . . , ASk+1.m of the assigned control zone RZk−1, RZk, RZk+1, the manipulated variables for the drive coils ASk−1.1, . . . , ASk−1.m, ASk.1, . . . , ASk.m, ASk+1.1, . . . , ASk+1.m, in general coil voltages or coil currents to be applied, which have to be set in order to move a transport unit Tn. This takes place in each time step of the control of the movement of the transport unit Tn. Of course, a plurality of transport units Tn could also be moved simultaneously in one control zone RZk−1, RZk, RZk+1. In this case, the segment control unit SRk−1, SRk, SRk+1 calculates the required manipulated variables for all the drive coils ASk−1.1, . . . , ASk−1.m, ASk.1, . . . , ASk.m, ASk+1.1, . . . , ASk+1.m of the assigned control zone RZk−1, RZk, RZk+1 to be energized.

Power electronics units LEk−1.1, . . . , LEk+1.m (shown only for a few drive coils in FIG. 1 for the sake of simplicity) ensure that the necessary coil voltages are applied to the required drive coils ASk−1.1, . . . , ASk−1.m, ASk.1, . . . , ASk.m, ASk+1.1, . . . , ASk+1.m in each time step of the control. For this purpose, the power electronics units LEk−1.1, . . . , LEk+1.m generate the electrical voltages for the drive coils ASk−1.1, . . . , ASk−1.m, ASk.1, . . . , ASk+1.1, . . . , ASk+1.m on the basis of the set manipulated variables (coil voltages or a coil current). In the latter case, a coil current is converted into an equivalent coil voltage. The power electronics units LEk−1.1, . . . , LEk+1.m may be independent hardware units, but may also be integrated in the segment control units SRk−1, SRk, SRk+1.

In order to control the movement of a transport unit Tn, the segment control units SRk−1, SRk, SRk+1 receive setpoint values Sn of the movement of each transport unit Tn, for example a setpoint position and/or a setpoint speed. A implemented controller, optionally comprising a controller cascade (typically consisting of a position controller, speed controller and force controller that are connected in series), calculates therefrom the required manipulated variables (cod voltages or cod currents). The setpoint values for a transport unit Tn may be delivered by a master system control unit 10, for example via a data communication connection 11, such as a field bus. However, instead of setpoint values Sn, a segment control unit SRk−1, SRk, SRk+1 may also receive only a movement target, for example a target position to be approached and/or a target speed, from which the segment control unit SRk−1, SRk, SRk+1 calculates a suitable movement profile, for example in the form of a polynomial of order 4 or 6, or even higher, in order to reach the movement target. The setpoint values Sn can then be derived from the movement profile in each time step of the control.

For controlling the movement of a transport unit Tn, it is also necessary to know the current position or speed of the transport unit Tn along the long stator 2. As is well known, a suitable position measurement arrangement is provided for this purpose, for example in the form of position sensors 4 that are arranged one behind the other along the long stator 2 and that deliver a position signal, for example as an actual value for the control, to the segment control unit SRk−1, SRk, SRk+1 or to the system control unit 10. Suitable position sensors 4 are, for example, magnetorestrictive sensors, magnetostrictive sensors, Hall sensors or optical sensors. As an equivalent thereto, a speed measurement arrangement could also be provided.

Figure 2:
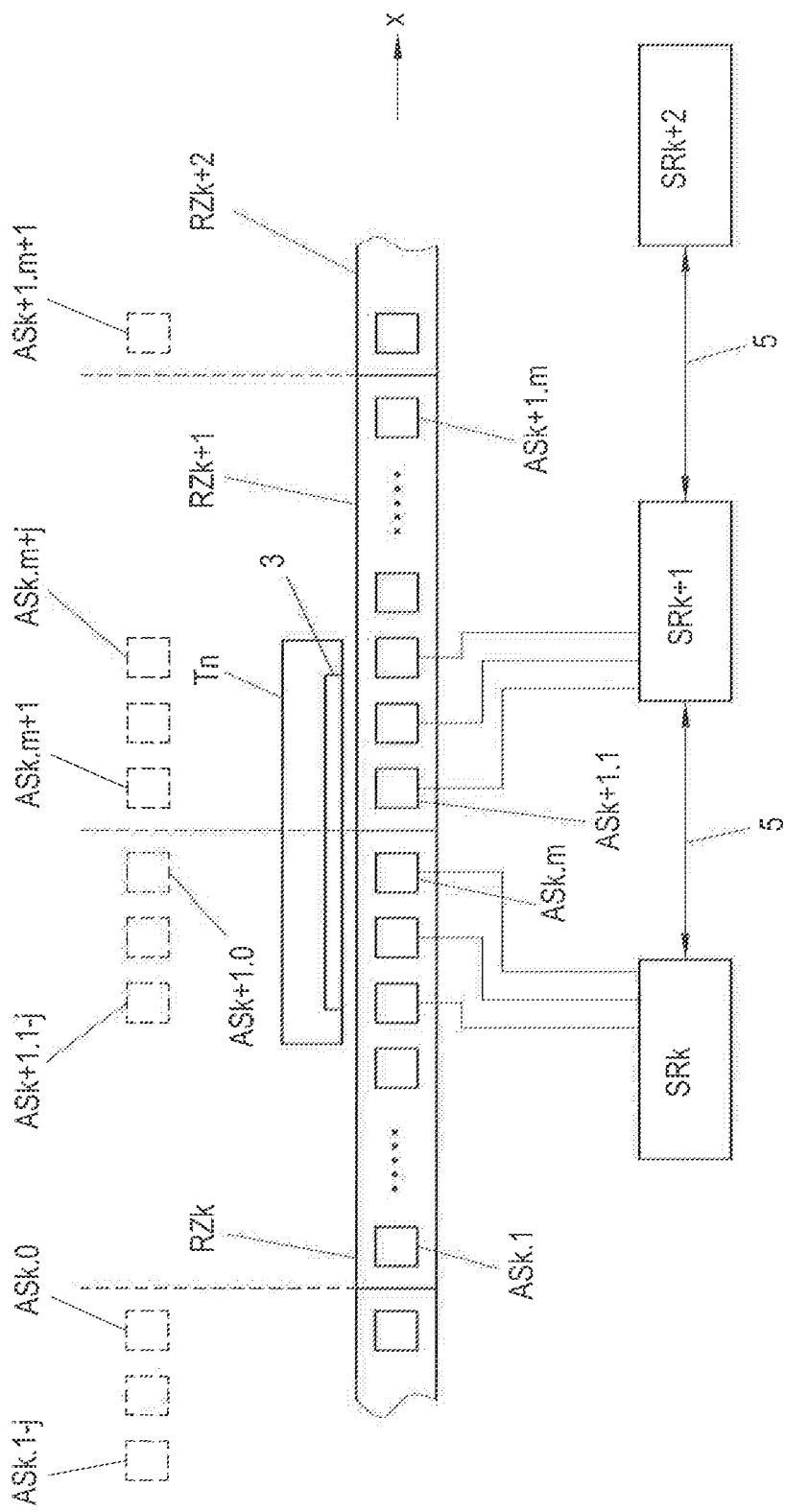
FIG. 2 shows a transition of a transport unit from a first control zone to a second control zone.

Within a control zone RZk−1, RZk, RZk+1, the control of a transport unit Tn can be carried out by the assigned segment control unit SRk−1, SRk, SRk+1. The segment control unit SRk−1, SRk, SRk+1 calculates the manipulated variables for the drive coils ASk−1.1, . . . , ASk−1.m, ASk.1, . . . , ASk+1.m, ASk+1.1, . . . , ASk+1.m to be energized in the corresponding control zone RZk−1, RZk, RZk+1. A problem arises, however, when the transport unit Tn is located in part in a first control zone RZk and at the same time in a following second control zone RZk+1 in the movement direction x, as shown in FIG. 2. Therefore, in this case, drive coils ASk.1, . . . , ASk.m, ASk+1.1,. . . , ASk+1.m of the two adjacent control zones RZk, RZk+1 have to be energized in order to move the transport unit Tn. In order to be able to manage this transition from one control zone RZk to the following control zone RZk+1 in a simple manner, the procedure according to the invention is as follows.

A control zone RZk comprises in drive coils ASk.1,. . . , ASk.m that are actually arranged along the long stator 2, i.e. are physically present in the form of hardware. A control zone RZk is extended at both ends by a number j of virtual drive coils ASk.1−j, . . . , ASk.0, ASk.m+1, . . . , ASk.m+j in each case, as indicated in FIG. 2. In this case, the number j does not necessarily need to be the same at each end. The virtual drive coils ASk.1−j, . . . , ASk.0, ASk.m+1, . . . , ASk.m+j are indicated by dashed lines. The extension occurs in the movement direction x at one end and counter to the movement direction x at the other end. The number j substantially depends on the geometry of the transport unit Tn and of the long stator 2, as well as the transition strategy, and is specified or can be assumed to be known or given. Said virtual drive coils ASk.1−j, . . . , ASk.0, ASk.m+1, . . . , ASk.m+j are not present in reality, however, but are treated by the assigned segment control unit SRk as though they were present. That is to say that the segment control unit SRk calculates the manipulated variables not only for the drive coils ASk.1, . . . , ASk.m that are actually present, but also for the virtual drive coils ASk.1−j, . . . , ASk.0, ASk.m+1, . . . , ASk.m+j if required. The segment control unit SRk then transmits the manipulated variables calculated for the virtual drive coils ASkm+1, . . . , ASkm+j via a data communication line 5 to the following second segment control unit SRk+1 in the movement direction x, as long as the first segment control unit SRk is responsible for controlling the movement of the transport unit Tn. The following second segment control unit SRk+1 directly uses the transmitted manipulated variables of the virtual drive coils ASk.m+1, . . . , ASk.m+j extended in the movement direction x in order to energize the drive coils ASk+1.1, . . . , ASk+1.m of the second control zone RZk+1 to be energized. To this end, in the second segment control unit SRk+1, the virtual drive coils ASk.m+1, ..., ASk.m+j are preferably directly assigned to the actually present drive coils ASk+1.1, ..., ASk+1.j in the second control zone RZk+1.

Therefore, when the transport unit Tn transitions from a first control zone RZk in the movement direction x to the following second control zone RZk+1, the following second segment control unit SRk+1 does not need to calculate the manipulated variables of the assigned drive coils ASk+1.1, ..., ASk+1.j itself, but instead receives said variables from the in the movement direction x preceding first segment control unit SRk. Only when the responsibility for the control transitions from the first segment control unit SRk to the following second segment control unit SRk+1 does said unit calculate the manipulated variables of the assigned drive coils ASk+1.1, ..., ASk+1.j in the second control zone RZk+1. In addition, the second segment control unit SRk+1 then, however, also calculates the manipulated variables of the virtual drive coils ASk+1.0, ..., ASk+1.1–j in the previous control zone RZk, which coils are extended counter to the movement direction x. The segment control unit SRk+1 transmits the calculated manipulated variables of said virtual drive coils ASk+1.0, ..., ASk+1.1–j to the preceding first segment control unit SRk which uses said manipulated variables for energizing the assigned drive coils ASk.m–j, ..., ASk.m in the first control zone RZk. As a result, even in the transition region between a first control zone and a following second control zone RZk+1 in the movement direction, in every case just one segment control unit SRk has to calculate the manipulated variables of the drive coils ASk.1, ..., ASk.m, ..., ASk+1.1, ..., ASk+1.m that are required for moving the transport unit Tn. In this way, the data communication line 5 does not need to transfer measured position values or a propulsive force, as was hitherto conventional in the prior art, but instead the manipulated variables for the drive coils ..., ASk.m, ASk+1.1, ..., ASk+1.m can be transmitted directly and then used directly for energization. Consequently, it is also possible to reduce the computation effort in the segment control units SRk, SRk+1 when a transport unit Tn transitions from a first control zone RZk to a following control zone RZk+1.

Since it is also possible for a plurality of transport units Tn to be moved simultaneously in a control zone RZk, RZk+1, it may also be the case that a first segment control unit SRk determines the manipulated variables for virtual drive coils ASk.1–j, ..., ASk.0 and ASk,m+1, ASk,m+j at both ends of the assigned control zone RZk and sends said variables to the relevant adjacent second segment control unit SRk–1 and SRk+1. Vice versa, a segment control unit SRk can receive the information regarding the virtual drive coils both from a preceding segment control unit SRk–1 in the movement direction, and can also receive information regarding the virtual drive coils of the segment control unit from a following segment control unit SRk+1 in the movement direction x.

The data communication line 5 is preferably a powerful direct data connection between two segment control units SRk, SRK+1, since said line may have to transfer manipulated variables in every time step of the control, typically in the region of from a few tens of microseconds to a few hundred microseconds, for example 50 µs. If the data communication connection 11 is sufficiently powerful, said connection can also be used as the data communication line 5.

If the long stator linear motor 1 is implemented having p-phase system, usually a 3-phase system comprising the phases U, V, W, similarly to a rotary electric motor, it may also be sufficient for fewer manipulated variables to be transmitted on account of the known phase relationship of the p-phases. If a transport unit Tn of a long stator linear motor 1 having a 3-phase system is moved by six drive coils for example, the six drive coils can be energized by V, W, –U, –V, –W for example. It would thus be sufficient for a total of just three manipulated variables, specifically for U, V, W, to be transmitted, because the others are directly related thereto. The step of transmitting the manipulated variables of virtual drive coils to a segment control unit therefore need not always mean the manipulated variables of all the required virtual drive coils. Therefore, only the necessary manipulated variables for the required virtual drive coils need to be transmitted, relieving the data communication via the data communication line 5.

The time at which the responsibility for the control switches can be specified as desired. A suitable transition strategy is specified for this purpose. It would be conceivable, for example, for the first segment control unit SRk to retain command of the control the transport unit Tn is located completely in the second segment control unit SRk+1. In this case, there must be as many virtual drive coils ASk.m+1, ..., ASkm+j present as the number of drive coils ASk–11, ..., ASk–1m, ASk1, ..., ASkm, ASk+11, ..., ASk+1m required for moving the transport unit Tn.

Advantageously, a segment control unit SRk is responsible for the control for as long as the center of the arrangement of the drive magnets 3 (viewed in the movement direction x) of the transport unit Tn is located in the assigned control zone RZk. Since the position of the transport unit Tn is detected and thus known, and the geometry of the arrangement of the drive magnets 3 of the transport unit Tn is of course also known, this can be continuously monitored in the segment control units SRk, SRk+1. Therefore, in this case, the number of virtual drive coils ASkm+1, ..., ASkm+j required is half the number of drive coils ASk–11, ..., ASk–1m, ASk1, ..., ASkm, ASk+11, ..., ASk+1m required for moving the transport unit Tn. It is clear therefrom that the number j of virtual drive coils is also substantially dependent on the length of the arrangement of the drive magnets of the transport unit Tn and on the transition strategy. For moving the transport unit Tn, it is also possible to use not only drive coils covered by the arrangement of the drive magnets 3, but also a number of further drive coils that are in front of and behind the arrangement of the drive magnets in the movement direction x. This, too, must of course be taken into account when determining the required number j.

When the responsibility for the control switches, and possibly even slightly before, the data communication line 5 may of course also transfer other data, such as a movement profile, to the following second segment control unit SRk+1 or, vice versa, to the preceding first segment control unit SRk.

The procedure according to the invention will be described in greater detail in the following, with reference to FIG. 3A-3D.

Figure 3A:
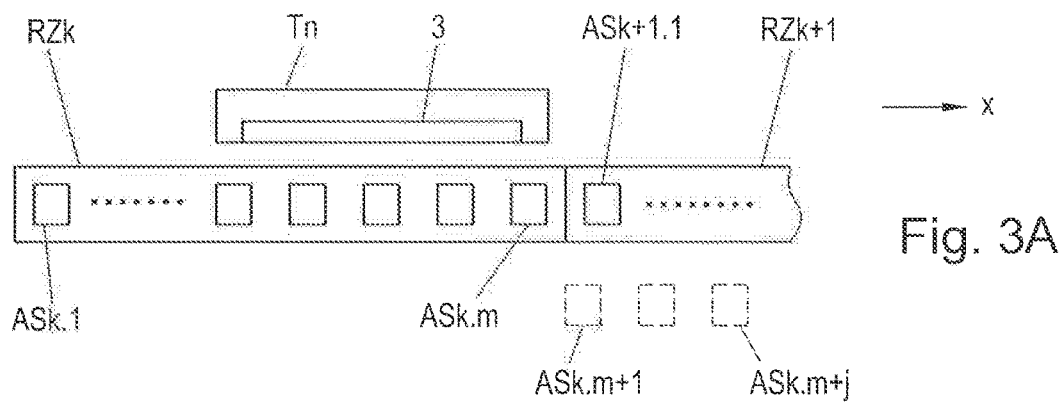
FIGS. 3A to 3D show the transition sequence according to the invention.

In FIG. 3A, the transport unit Tn is located entirely in a first control zone RZk and moves in the movement direction x. The segment control unit SRk (no longer shown, for the sake of simplicity) assigned to the control zone RZk calculates the manipulated variables for the drive coils ASk.1, ..., ASk.m that are to be energized in the control zone RZk in order to move the transport unit Tn.

Figure 3B:
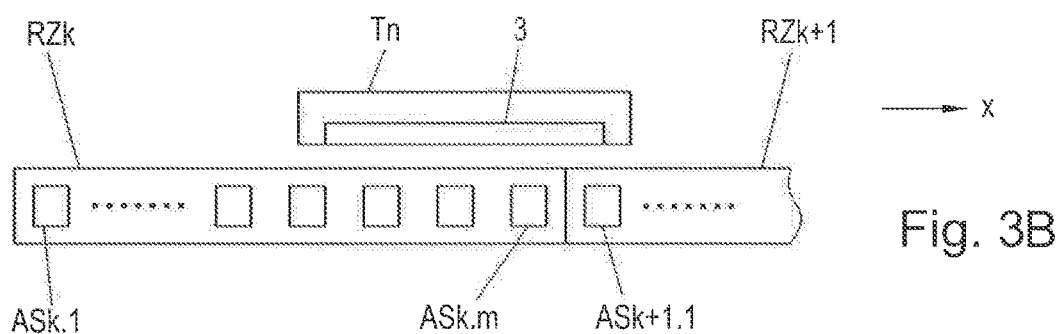

In FIG. 3B, the transport unit Tn has crossed the boundary between two control zones RZk, RZk+1 that are adjacent in the movement direction x and is now located in part in the first control zone RZk and in part in the following second control zone RZk+1. The first segment control unit SRk that is responsible for the control of the transport unit Tn now calculates not only the manipulated variables of the required drive coils ASk.1, . . . , ASk.m of the assigned first control zone RZk, but also the manipulated variables for the required virtual drive coils ASk.m+1, . . . , ASk.m+j. The number j of virtual drive coils required of course depends on how far the to unit Tn has entered the following control zone RZk+1. The manipulated variables of the virtual drive coils ASk.m+1, . . . , ASk.m+j are transferred via the data communication line 5 to the following segment control unit SRk+1 which uses said variables directly for energizing the corresponding actually present drive coils ASk+1.1, . . . , ASk+1.1+j of the assigned control zone RZk+1. For this purpose, it is possible for virtual drive coils ASk.m+1, . . . , ASk.m+j to be directly assigned to drive coils ASk+1.1, . . . , ASk+1.1+j in the control zone. RZk+1, for example ASk.m+1→ASk+1.1, . . . , ASk.m+j→ASk+1.1+j. The assignment can thus be implemented extremely easily.

Figure 3C:
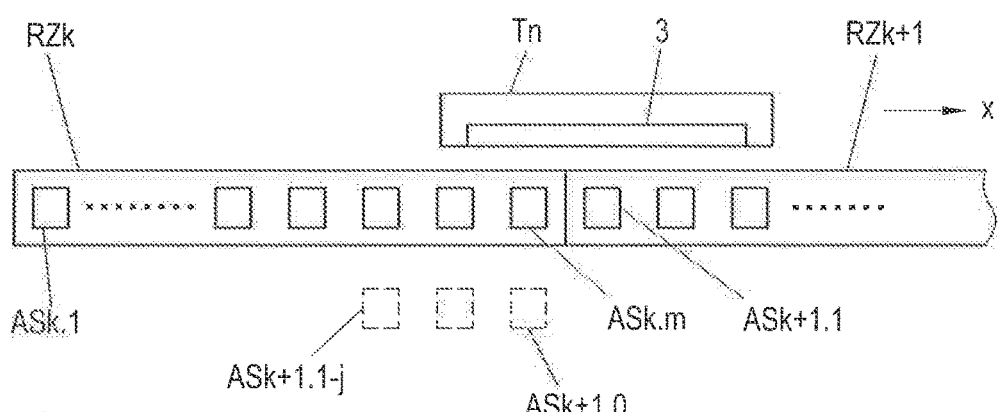

It is assumed, in FIG. 3C, that the responsibility for the control of the movement of the transport unit Tn has transitioned to the following segment control unit SRk+1, for example because the center of the transport unit Tn or of the arrangement of drive magnets 3 of the transport unit Tn (in the movement direction x) is now located in the following second control zone RZk+1. Said second segment control Unit SRk+1 now calculates not only the manipulated variables of the required drive coils ASk+1.1, . . . , ASk+1.m of the assigned control zone RZk+1, but also the manipulated variables for the required virtual drive coils ASk+1.0, . . . ., ASk+1.1−j that precede in the movement direction. The number of virtual drive coils ASk+1.0, . . . , ASk+1.1−j required of course again depends on how far the transport unit Tn has entered the following control zone RZk+1. The manipulated variables of the virtual drive coils ASk+1.0, . . . , ASk+1.1−j are transferred via the data communication line 5 to the preceding segment control unit SRk which uses said variables for energizing the corresponding actually present drive coils ASk.m, . . . , ASk.m−j of the assigned control zone RZk. Here, too, there is preferably again an assignment between virtual drive coils ASk+1.0, . . . , ASk+1.1−j and drive coils ASk.m, . . . , ASk.m−j in the first control zone RZk.

Figure 3D:
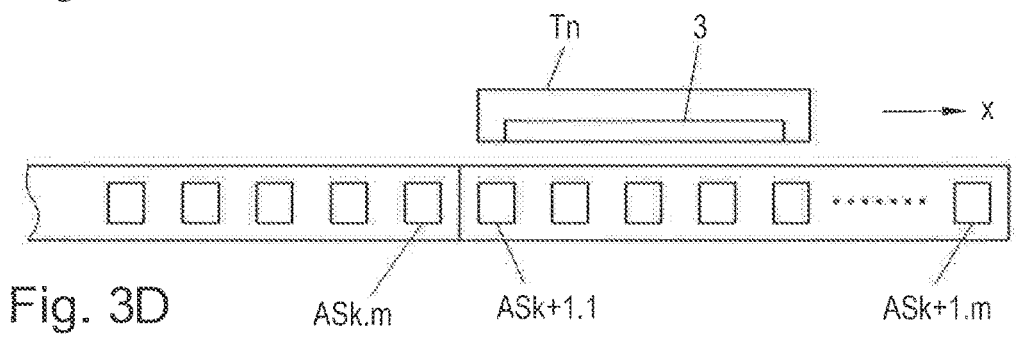

In FIG. 3D, the transport unit Tn has finally entered so far into the control zone RZk+1 that now only drive coils ASk+1.1, . . . , ASk+1.m in the second control zone RZk+1 need to he energized in order to move the transport unit To. This is controlled by the assigned second segment control unit SRk+1. Virtual drive coils are then no longer required for the transport unit Tn until the next time a boundary between control zones RZ is crossed.

In the opposite movement direction, of course the same takes place in the opposite direction.

It is noted that the foregoing examples have been provided merely for the purpose of explanation and are in no way to be construed as limiting of the present invention. While the present invention has been described with reference to an exemplary embodiment, it is understood that the words which have been used herein are words of description and illustration, rather than words of limitation. Changes may be made, within the purview of the appended claims, as presently stated and as amended, without departing from the scope and spirit of the present invention in its aspects. Although the present invention has been described herein with reference to particular means, materials and embodiments, the present invention is not intended to be limited to the particulars disclosed herein, rather, the present invention extends to all functionally equivalent structures, methods and uses, such as are within the scope of the appended claims.

What is claimed:

1. A method for moving a transport unit comprising an arrangement of drive magnets in a movement direction along a long stator of a long stator linear motor, wherein the long stator being divided into at least a first control zone comprising a plurality of drive coils and a second control zone comprising a plurality of drive coils, wherein the first control zone being controlled by a first segment control unit and the second control zone being controlled by a second segment control unit in that in a control zone the assigned segment control unit calculates the manipulated variables for energizing the drive coils in the control zone that are required for moving the transport unit, as long as, in order to move the transport unit, exclusively drive coils in one control zone are energized, characterized in that, during the transition of the transport unit from the first control zone, in the movement direction, to the following second control zone, wherein drive coils of the first control zone and of the second control zone being energized in order to move the transport unit, initially the first segment control unit remains responsible for controlling the movement of the transport unit and the first control zone is extended, in the movement direction, by a number of virtual drive coils and the first segment control unit that is assigned to the first control zone also calculates the necessary manipulated variables for the required virtual drive coils, in that the first segment control unit transmits the necessary manipulated variables for the required virtual drive coils to the second segment control unit that is assigned to the second control zone, and In that the second segment control unit uses the transmitted manipulated variables for the required virtual drive coils in order to energize the drive coils of the second control zone that are required for moving the transport unit.

2. The method according to claim 1, wherein the second segment control unit assigns the virtual drive coils of the first control zone to drive coils of the second control zone, and uses the received manipulated variables of the virtual drive coils for energizing the assigned drive coils of the second control zone.

3. The method according to claim 1, wherein, after a defined time point of the transition, the responsibility for controlling the movement of the transport unit switches to the second segment control unit of the second control zone and the second control zone is extended, counter to the movement direction, by a number of virtual drive coils and the second segment control unit that is assigned to the second control zone also calculates the manipulated variables for the required virtual drive coils, in that the second segment control unit transmits the necessary manipulated variables for the required virtual drive coils to the first segment control unit that is assigned to the first control zone, and in that the first segment control unit uses the transmitted manipulated variables for the required virtual drive coils in order to energize the drive coils of the first control zone that are required for moving the transport unit.

4. The method according to claim 3, wherein the first segment control unit assigns the virtual drive coils of the second control zone to drive coils of the first control zone and uses the received manipulated variables of the virtual drive coils for energizing the assigned drive coils of the first control zone.

5. The method according to claim 3, wherein the responsibility switches from the first segment control unit to the second segment control unit when the center of the arrangement of the drive magnets of the transport unit transitions from the first control zone to the second control zone.

6. Long stator linear motor comprising a plurality of drive coils that form a long stator of the long stator linear motor, along which a transport unit comprising, an arrangement of drive magnets can be moved in a movement direction, wherein the long stator being divided into at least a first control zone comprising a plurality of drive coils and a second control zone comprising, a plurality of drive coils, wherein a first segment control unit for controlling the drive coils of the first control zone is assigned to the first control zone and a second segment control unit for controlling the drive coils of the second control zone is assigned to the second control zone, wherein the transport unit is moved in that in a control zone the assigned segment control unit calculates the manipulated variables for energizing the drive coils in the control zone that are required for moving the transport unit as long as the transport unit is located exclusively in one control zone, wherein, during the transition of the transport unit from the first control zone, in the movement direction, to the following, second control zone, wherein drive coils of the first control zone and of the second control zone are to be energized in order to move the transport unit, initially the first segment control unit remains responsible for controlling the movement of the transport unit and the first segment control unit calculates manipulated variables for a number of virtual drive coils that virtually adjoin the first control zone in the movement direction, and in that a data communication line is provided which connects the first segment control unit to the second segment control unit and transmits the necessary manipulated variables for the required virtual drive coils to the second segment control unit, and in that the second segment control unit uses the transmitted manipulated variables for the required virtual drive coils in order to energize the drive coils of the second control zone that are required for moving the transport unit.

7. The long stator linear motor according to claim 6, wherein the second segment control unit assigns the virtual drive coils of the first control zone to drive coils of the second control zone, and uses the received manipulated variables of the virtual drive coils for energizing the assigned drive coils of the second control zone.

8. The long stator linear motor according to claim 6, wherein, after a defined time point of the transition, the responsibility for controlling the movement of the transport unit switches to the second segment control unit of the second control zone, and the second segment control unit calculates manipulated variables for a number of virtual drive coils that are located virtually in front of the second control zone in the movement direction, in that the second segment control unit transmits the necessary manipulated variables for the required virtual drive coils to the first segment control unit, and in that the first segment control unit uses the transmitted manipulated variables for the required virtual drive coils in order to energize the drive coils of the first control zone that are required for moving the transport unit.

9. The long stator linear motor according to claim 6, wherein the first segment control unit assigns the virtual drive coils of the second control zone to drive coils of the first control zone, and uses the received manipulated variables of the virtual drive coils for energizing the assigned drive coils of the first control zone.

10. The long stator linear motor according to claim 8, wherein the responsibility switches from the first segment control unit to the second segment control unit when the center of the arrangement of the drive magnets of the transport unit transitions from the first control zone to the second control zone.

* * * * *